US008670529B1

(12) United States Patent
Fomin et al.

(10) Patent No.: US 8,670,529 B1
(45) Date of Patent: Mar. 11, 2014

(54) CONTEXT AWARE HELP SYSTEM

(71) Applicant: Ring Central, Inc., San Mateo, CA (US)

(72) Inventors: Michael Fomin, San Mateo, CA (US); Vlad Vendrow, San Mateo, CA (US)

(73) Assignee: RingCentral, Inc., San Mateo, CA (US)

( * ) Notice: Subject to any disclaimer, the term of this patent is extended or adjusted under 35 U.S.C. 154(b) by 0 days.

(21) Appl. No.: 13/716,625

(22) Filed: Dec. 17, 2012

(51) Int. Cl.
*H04M 1/64* (2006.01)
(52) U.S. Cl.
USPC .............. 379/88.22; 379/88.17; 379/265.09
(58) Field of Classification Search
USPC ............... 379/201.02, 88.18, 265.09, 88.17, 379/88.22
See application file for complete search history.

(56) References Cited

U.S. PATENT DOCUMENTS 6,748,420 B1 * 6/2004 Quatrano et al. ............. 709/205
2010/0322404 A1 * 12/2010 Coleman et al. ......... 379/220.01

* cited by examiner

*Primary Examiner* — Gerald Gauthier
*Assistant Examiner* — Simon King
(74) *Attorney, Agent, or Firm* — Stolowitz Ford Cowger LLP

(57) ABSTRACT

A context aware help system generates context data for web sessions. The context data may be used either by a human operator or by an automated response system to help resolve user web session problems. For example, a user may initiate a telephone call to the context aware help during a web session. The context data may be displayed to a telephone operator in response to the telephone call. The telephone operator may use the context data to determine what web pages and user inputs were previously entered during the web session. This allows the telephone operator to quickly analyze web session problems and provide more effective and efficient web session support. The help system may alternatively, or in addition, provide other types of automated audio or data support.

25 Claims, 11 Drawing Sheets

CONTEXT AWARE HELP SYSTEM

BACKGROUND

A user may have questions or problems during web sessions. For example, the user may need to navigate through several web pages in order to select and purchase items on-line. In another example, a user may need to navigate through multiple web pages to configure a service, such as configuring a cloud based Public Branch eXchange (PBX).

During the web sessions the user may have questions about what information to enter into particular web page fields. In another situation, the user may become confused or lost while navigating through the web pages and may not access the correct web pages for properly purchasing a product or configuring a service.

Websites may provide on-line help manuals. However, navigating through an on-line help manual may be time consuming, tedious, and just as confusing as navigating through the websites. Websites may provide interactive help features. For example, some websites may display popup windows when a user enters the wrong information into a web page field. The popup window may display a help message or may allow the user to chat on-line with an operator.

While sometimes helpful, interactive on-line help features may not be able to resolve some web session problems and/or may be tediously slow in resolving the web session problems. For example, the user may have to type a question into the pop-up window that describes every web page selected during the web session and describes every input entered into the web pages. Some on-line pop-up windows also allow the user to call a human operator. However, in order for the human operator to understand and resolve the problem, the user still needs to explain every detail about the web pages and inputs entered during the web session.

DETAILED DESCRIPTION

A context aware help system tracks the context of web sessions. The context may be used either by a human telephone operator or by an automated help system to help resolve web session problems. For example, a user may select a help link during the web session. The help system may automatically send context data for the web session to the telephone operator. The telephone operator can then replay the web session and quickly determine which web pages and what user inputs have been entered by the user. The context data allows the telephone operator to analyze web session problems more quickly, possibly before the user even needs to ask a question. Thus, web session support is provided more effectively and efficiently.

The context aware help system may alternatively, or in addition, provide automated audio or data support. For example, analysis of the context data may provide a specific solution to a web session problem. A text to speech system may be used to play a customized audio message back to the user that explains a solution to the problem. Alternatively, a data message may be sent to the user over a network connection that explains the solution.

A variety of other support operations may be provided based on the web session context data. One operation may automatically reroute help calls to different telephony servers based on the context data. For example, the context data may indicate the web session is being conducted in Russian. The help system may send an address (e.g., phone number, IP address, URL) for a Russian based telephony server to a client device used in the web session. The client device then may use the phone number to call the Russian based telephony server whenever the user selects a help link.

In another example, the web session context data may be used for reinstating a prior web session. For example, a user may be conducting a web session on a mobile phone. The mobile phone may be temporarily disconnected from an application server. The help system may automatically reinstate the prior web session using the context data captured prior to the mobile phone disconnection. The help system also may analyze the web session context data in real-time prior to the user even selecting the help link. Help messages can then be sent proactively to the user when the context data indicates possible web session problems.

Figure 1:
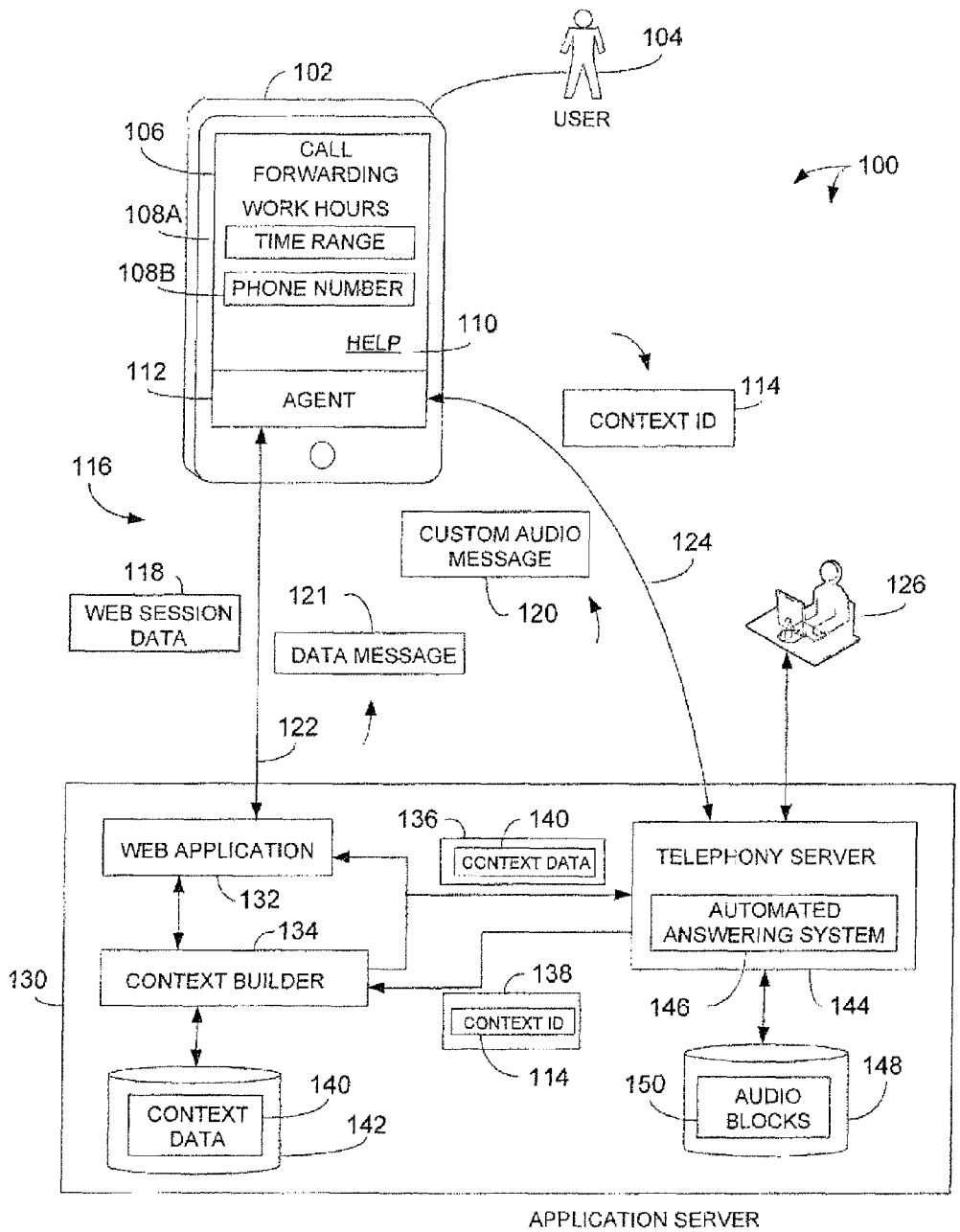
FIG. 1 depicts an example context aware help system.

FIG. 1 depicts an example diagram of a context aware help system 100. A client device 102 may conduct a web session 116 with a web application 132 on application server 130 via a network 122. Client device 102 may be any computing device configured to conduct a mobile or wired web session, such as a smart phone, personal computer, tablet computer, terminal, personal digital assistant, VoIP phone, or the like, or any combination thereof.

In one example, network 122 may comprise any combination of Local Area Networks (LANs), Wide Area Networks (WANs), Internet Protocol (IP) networks, phone networks, Public Services Telephone Networks (PSTN), wireless networks, cellular networks, Wi-Fi networks, Bluetooth networks, cable networks, data buses, or the like, or any combination thereof used for establishing the web session 116 with client device 102.

During web session 116, web session data 118 may be exchanged between web application 132 and client device 102. Web session data 118 may comprise any data needed for capturing, replaying, and/or identifying any event in web session 116. For example, web session data 118 may comprise web pages, such as a web page 106 sent from web application 132 and displayed on client device 102. Web session data 118 also may comprise user input data, such as data input by a user 104 into fields 108 of web page 106. For example, user input data may comprise a credit card number entered by user 104 into one of fields 108 displayed in web page 106. User input data also may comprise cursor movements, keyboard entries, icon selections, or any other user activity within web page 106.

In one example, web application 132 may provide phone services and client device 102 may be used for setting up different phone service configurations, such as employee extensions, call forwarding rules, voicemail answering preferences, etc. In this example, web page 106 may contain a field 108A for entering a time period for forwarding phone calls and a field 108B for entering a phone number for forwarding the phone calls. Web session data 118 may include the web pages 106 and the phone service configurations entered into web page 106. Of course this is just one example of any type of web pages 106 and fields 108 that may be used during web session 116.

A context builder 134 may comprise a server configured to capture and store web session data 118. For example, during web session 116, user 104 may send Hyper Text Transfer Protocol (HTTP) requests to web application 132 for different web pages 106. Each web page 106 transferred to client device 102 in response to an HTTP request may be captured and sent to context builder 134. The user input data generated on client device 102 also may be transmitted to context builder 134. For example, the user input data captured in fields 108 of web page 106 may be sent back to context builder 134.

Web application 132, or a separate monitoring system, may capture and forward web session data 118 to context builder 134. An agent 112 on client device 102 may capture and send some portions of web session data 116 back to context builder 134. Agent 108 may be a client application preinstalled on client device 102. In one example, agent 112 may capture and send web pages 106 and the user input data back to context builder 134. In another example, agent 112 may only capture the local user input data that is not transmitted over network 122 during web session 116. For example, certain user selections and inputs may only change local logic states of web page 106 on client device 102 and may never be sent back to web application 132. Agent 112 may capture and send the local user inputs back to context builder 134.

Monitoring servers, agent 112, and/or context builder 134 may add additional metadata to web session data 118 that may further identify a context of web session 116. For example, time stamps may be attached to web pages 106 to identify when and in what order web pages 106 were accessed by user 104 during web session 116. The time stamps also may be attached to user input events to identify the order the user entered data into fields 108 of web pages 106. The meta data also may include a context identifier 114 that uniquely associates web session data 118 with client device 102.

Other metadata added to web session data 118 may include, but is not limited to, an Internet Protocol (IP) address for client device 102, a client browser type and version for a browser operating on client device 102, a user name and password used for initiating web session 116; page identifiers, Document Object Model (DOM) data and identifiers, etc. Any combination of web session data 118, context identifier 114, and/or associated metadata may be referred to as context data 140 and may be stored in database 142.

During web session 116, context builder 122 may generate context data 140 as described above. User 104 may have a problem or question during web session 116. For example, client device 102 may use web session 116 to configure call forwarding rules, voice call greetings, mail box set ups, etc. for a telecommunication service. User 104 may get lost while navigating through the different web pages 106.

User 104 may select a help link 110 to request help support. Help link 110 may be displayed on web page 106 or may be displayed somewhere within the web browser or web application operating on client device 102. Selecting help link 106 may cause agent 112 to establish a telephone connection 124 with a telephony server 144 using a phone number or other telephony server 144 address. In one example, the telephone call may be forwarded to a human telephone operator 126. In another example, the telephone call may be answered by an automated answering system 146.

Agent 112 also may automatically send context identifier 114 over telephone connection 124 in response to selection of help link 110. For example, agent 112 may generate Dual Tone Multiple Frequency (DTMF) tones or Session Initiation Protocol (SIP) data over connection 124 that identify context identifier 114. It should also be understood that telephone connection 124 may be any type of telephony connection, such as a Public Services Telephone Network (PSTN) telephone connection, Integrated Services Digital Network (ISDN) telephone connection, or a Voice over Internet Protocol (VoIP) telephone connection.

Telephony server 144 uses context identifier 114 to locate context data 140 associated with web session 116. For example, telephony server 144 may send a request 138 to context builder 122 that contains context identifier 114. Context builder 122 uses context identifier 114 to locate context data 140 associated with web session 116 and sends a response 136 back to telephony server 144 containing the identified context data 140. Context data 140 may be displayed on a computer screen to telephone operator 126 or may be sent directly over network 122 and displayed on client device 102.

Context data 140 is collected and generated by context builder 134 up until and during the time user 104 establishes telephone connection 124 with telephony server 144. Therefore, telephony server 144 and telephone operator 126 are provided with the most up to the minute history for web session 116. Telephone operator 126 then can view web pages 106 previously opened by user 104 during web session 116 and can view the data previously entered into the web pages by user 104 during web session 116.

Telephone operator 126 may discover web session problems even before user 104 asks a question. For example, telephone operator 126 may determine from context data 140 that the user was attempting to configure call forwarding rules but then inadvertently selected a web page 106 for other phone services. Telephone operator 126 may discuss the web session problem with user 104 orally over telephone connection 124. For example, telephone operator 126 may advise user 104 how to navigate back to the web pages needed for completing the call forwarding rules.

Context data 140 allows telephone operator 126 to more efficiently and effectively respond to help requests. For example, context data 140 relieves user 104 from having to explain orally to telephone operator 126 what steps were previously performed and what data was previously entered during web session 116. Telephone operator 126 can more quickly determine the history of web session 116 by reviewing context data 140 and can then provide more helpful responses to user questions. Thus, customer support may be more economical since web session problems may be resolved more quickly.

Other support operations may be provided based on context data 140. For example, automated answering system 146 may use a text to speech application to generate custom automated audio messages 120. A database 148 may contain different custom audio blocks 150 associated with different states of web session 116. In response to establishing telephone connection 124, telephony server 144 again may send a request 138 to context builder 134 containing context identifier 114. Context builder 134 again may send a response 136 containing context data 140 for web session 116. In this example, automated answering system 146 uses context data 140 and audio blocks 150 to build custom automated audio message 120.

For example, context data 140 may identify a browsing path for user 104 during web session 116. The browsing path may indicate the user was navigating through web pages 106 associated with creating call forwarding rules. Context data 140 also may identify the data entered or selected by user 104 in web pages 106 for configuring the call forwarding rules.

Telephony server 144 may determine some information needed for completing the call forwarding rules is missing or incorrectly entered into web pages 106. Automated answering system 146 may use audio blocks 150, or may dynamically generate audio blocks, to generate and send a custom automated audio message 120 back to client device 102. Audio message 120 may instruct user 104 to select a field in one of web pages 106 to complete configuration of the call forwarding rules.

Context aware help system 100 does not just provide audio customer support over telephone connection 124. In another example, context builder 134 may send data messages 121 back to client device 102 over network 122. Data messages 121 may be initiated by telephone connection 124 or may be initiated based on other events detected in context data 140. In another example, data messages 121 may be sent back to client device 102 based on a request sent by agent 112 over network 122 that contains context identifier 114.

Data messages 121 may contain any of the same information provided in automated customize audio messages 120 generated by telephony server 144. However, instead of being sent as audio signals over telephone connection 124, data messages 121 may be text and/or audio messages sent over network 122. Data messages 121 may contain some or all of the same context data 140 sent to telephony server 144 and/or telephone operator 126 and may provide advice to user 104 for completing tasks in web session 116.

Web application 132, context builder 134, and telephony server 144 do not have to be located in the same application server 130. For example, telephony server 144 may be a separately and/or remotely operated server that connects via a network to a separately operated context server that operates context builder 134. In another example, client device 102 may operate context builder 134 and may locally generate context data 140, automated customized audio messages 120, and/or data messages 121.

Figure 2:
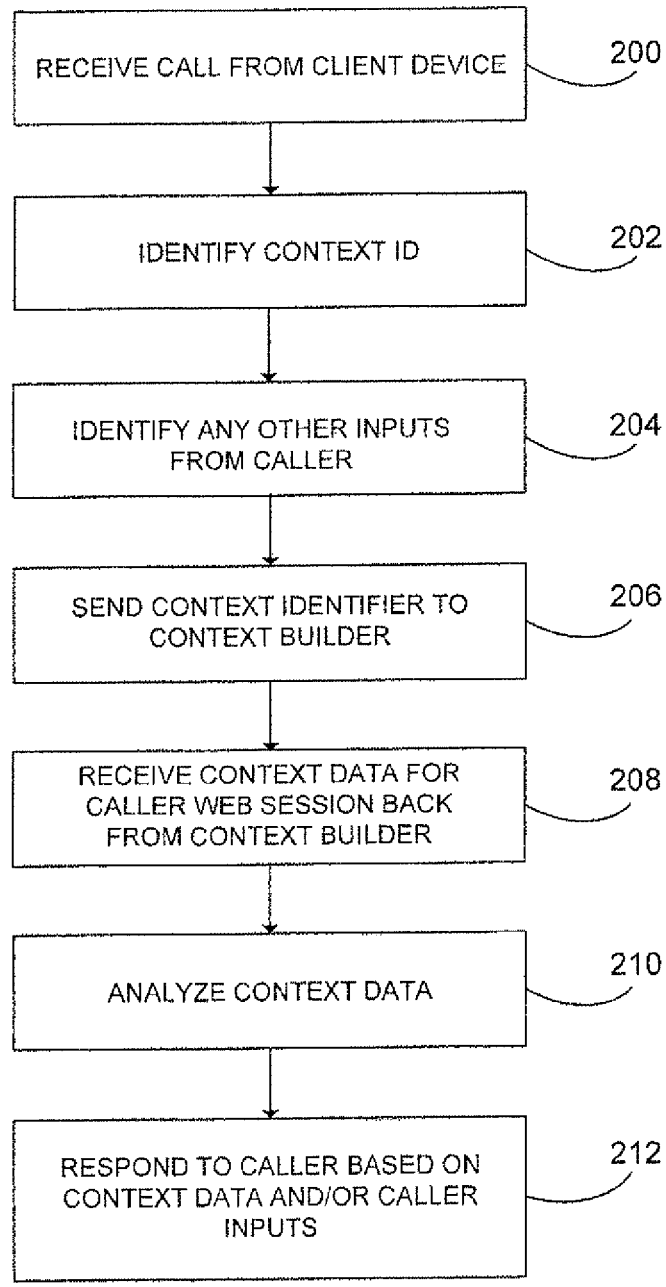
FIG. 2 depicts an example of process for generating context based responses.

FIG. 2 depicts an example process for handling help requests. In operation 200, a call is received from a client device. As explained above, the call may be received over a telephone connection from a computing device that is currently conducting a web session with a website or previously conducted a web session with the website.

Operation 202 receives a context identifier over the telephone connection that may identify the current web session for the client device. If a web session is disconnected or terminated, the context identifier may identify the most recent web session for the client device. Operation 204 may identify any other information sent over the telephone connection. For example, the help link displayed on the client device may include fields that ask the user if they would like to talk to a human website operator, receive a customized automated audio message, or receive a text message in a popup window.

The context identifier is sent to the context builder in operation 206 and the context data associated with the context identifier is received in operation 208. As discussed above, the context data may contain a history of navigation, state, and user inputs for the associated web session. The context identifier may be associated with the last web session for the client device. Therefore, the associated context data may provide the most recent and most relevant web session information for the client device help request.

In operation 210, the context data is analyzed. For example, the context data may be viewed by a human telephone operator or may be processed by an automated answering system. In operation 212, a response is sent to the client device based on the context data and any other call inputs. The response may be a manual communication provided by the human telephone operator over the telephone connection or may be an automated customized audio message sent over the telephone connection by the telephony server. In yet another example, the response may be text message sent to client device 102 over a network connection.

Figure 3:
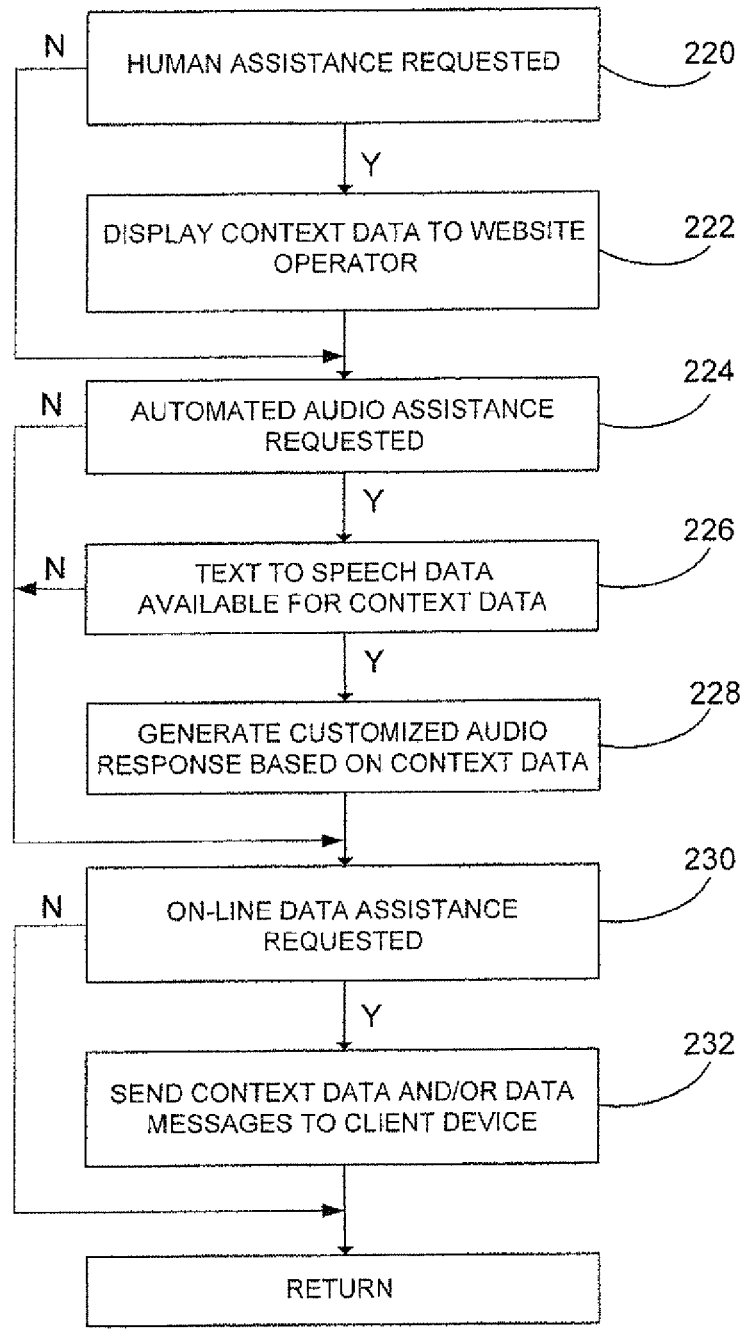
FIG. 3 depicts an example process for generating different types of context based responses.

FIG. 3 depicts an example of different types of assistance that may be provided to a user based on the context data. In operation 220, human assistance may be requested. For example, the user may select a help link displayed on the client device. The help link may be configured to request human operator support. In operation 222, the context data for the web session is displayed on the screen of the telephone operator. The telephone operator then may discuss the web session problems with the user over the telephone connection while viewing the context data.

The context data may be pre-processed to help the telephone operator more quickly determine the web session problem. For example, the context data may be displayed in a user interface for a web session replay system that automatically steps through each web page and each user input for the previously captured web session. In another example, the context data may be parsed to provide a summary of web session events. For example, a list may identify the sequence of web pages displayed to the user and the inputs entered by the user into the web pages. The list may also identify/summarize which tasks were completed in the web session and which tasks have not yet been completed in the web session.

Automated audio assistance may be requested in operation 224. For example, the agent application on the client device may be configured to request automated audio responses or the telephony server may be preconfigured to provide automated audio responses. In operation 226, the automated answering system may analyze the context data and determine if audio files exist, or can be dynamically created, for generating an automated audio message.

In operation 228, a customized automated audio response may be generated based on the context data and sent over the telephone connection to the client device. For example, the context data may indicate that the user never completed a web session task for purchasing a product. The automated answering system may generate an audio message that informs the user how to complete the on-line purchase. In another example, a customized audio hold message or a customized audio advertisement may be played while the automated answering system is generating a response or forwarding the context data to the telephone operator. The hold message or advertisement may be based on the context data. For example, if the context data indicates the user is Russian, a Russian advertisement may be played over the telephone connection.

On-line data assistance may be requested in operation 230. For example, the agent operating on the client device may be configured to request on-line text message assistance. Operation 232 may generate an automated text response based on the context data. The text response may be sent over an HTTP network connection to the client device. In another example, the human telephone operator may type a text response based on the context data and/or a text message received from the user and send the manually created text response over the network connection.

In yet another example, some of the context data may be sent directly to the client device. For example, the context data displayed on the computer terminal of the telephone operator may also, or alternatively, be sent over the network connection to the client device.

Figure 4:
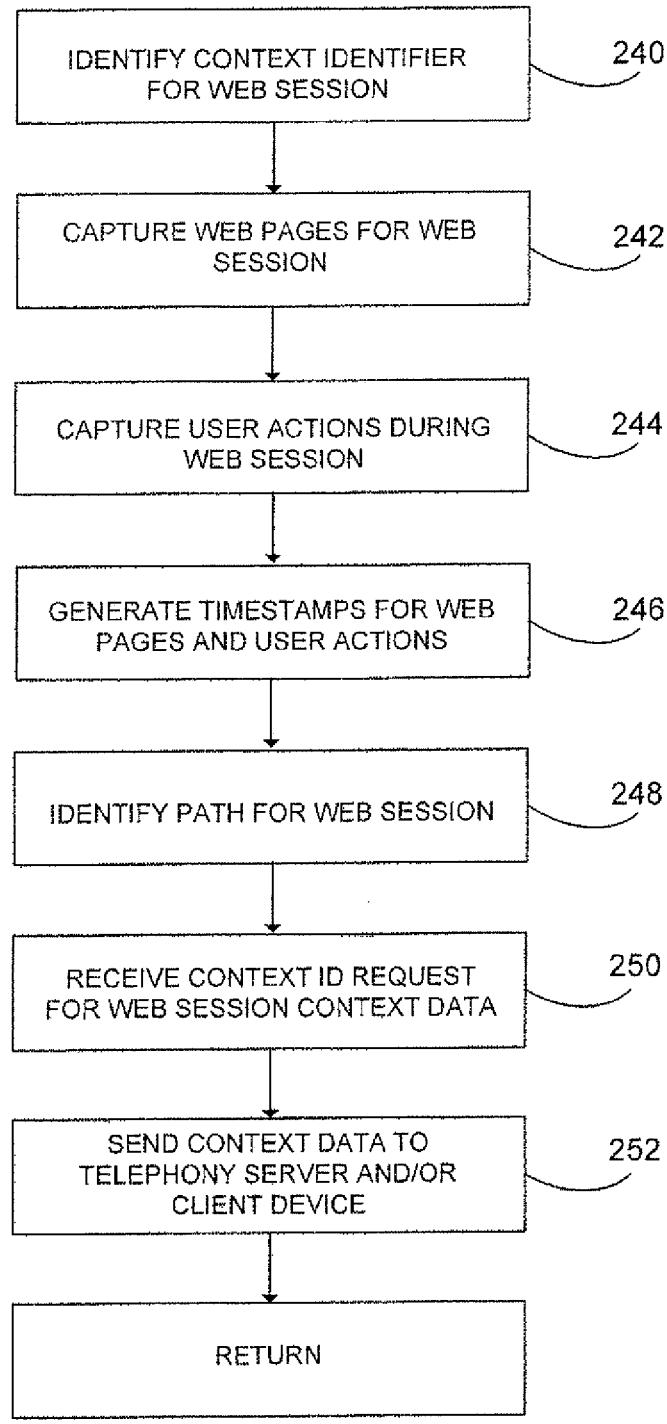
FIG. 4 depicts an example process for generating context data.

FIG. 4 depicts an example process for building context data for a web session. In operation 240 a context identifier is identified for the web session. The context identifier can be any number, text, or other information that uniquely identifies and associates the web session with a particular client device. The context identifier may be automatically generated by the web application, context builder, or the agent operating on the client device. The context identifier may include a user name and/or a time indicator. This may allow the help system to locate the most recent context data for the client device.

Operation 242 captures web pages for the web session. As discussed above, the web pages may be captured by the web application, a network monitor, and/or the agent operating on the client device and forwarded to the context builder. Operation 244 may capture user actions during the web session and forward the user actions to the context builder. For example, the web application, network monitor, and/or agent may also capture inputs entered into fields of the web pages and capture selections of icons or links on the web pages.

Operation 246 may generate timestamps, if needed, for the captured web pages and/or user input data. For example, the web application, network monitor, and/or agent may identify when web pages are selected during the web session and when user input data is entered into the selected web pages. The timestamps are attached to the captured web session data and may be used for replaying the web session in the same sequence as previously executed by the user.

Operation 248 may identify the path taken by the user during the web session. For example, the timestamps can be used to generate a list that identifies which web pages were opened by the user and in what order. The list may be used to quickly determine a state of the web session just prior to the user calling the telephony server. Any portion of the captured web session data may be saved as context data. In one example, only the web session path and other selected web session analytics may be saved as context data. In another example, all of the captured web session data is saved as context data so that the entire web session may be replayed.

Operation 250 receives a request that contains a context identifier. The context data associated with the context identifier is identified and either sent to the telephony server, to the client device, or to another system for further analysis. The destinations for sending the context data may be preconfigured, identified in the help request, based on the context identifier, or based on other information within the context data.

Figure 5:
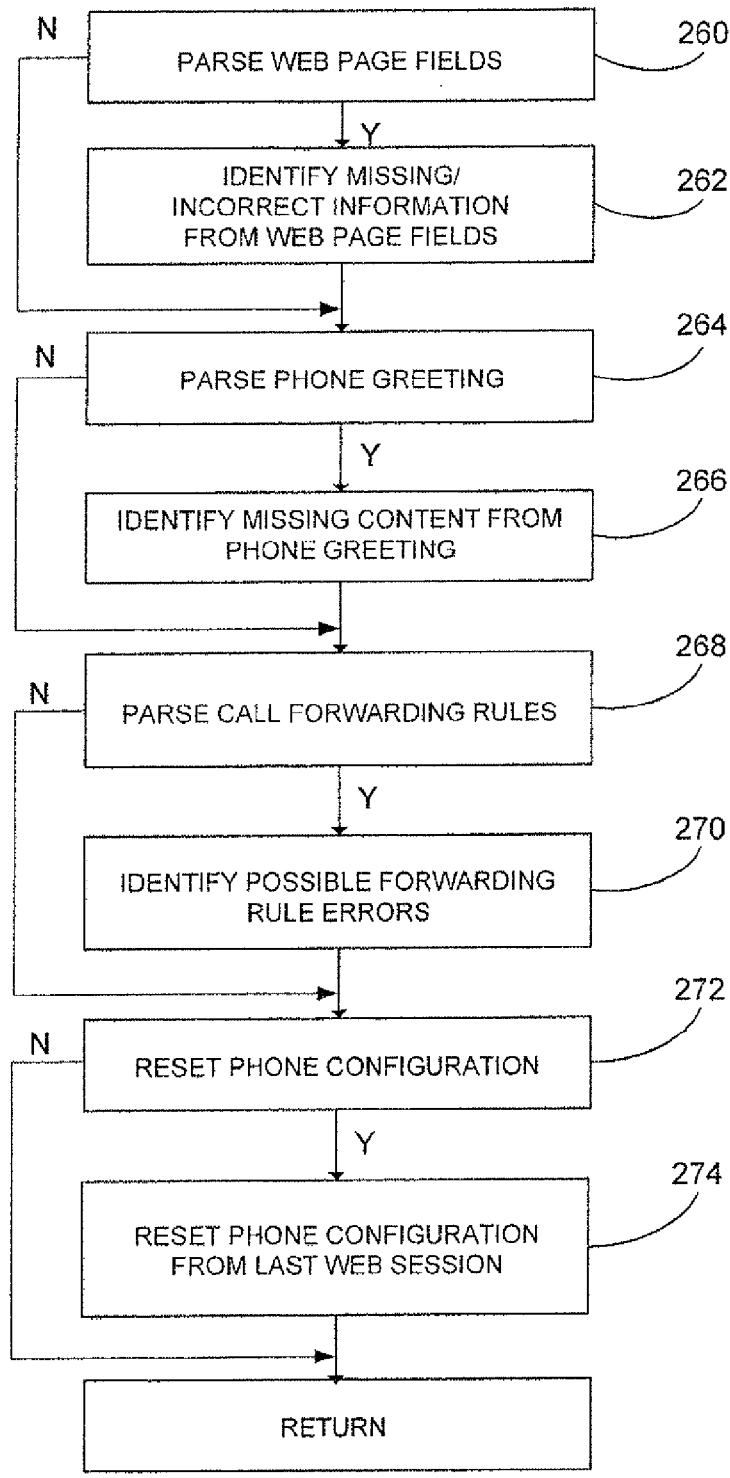
FIG. 5 depicts example processes for providing web session assistance.

FIG. 5 depicts one example of how the context data may be analyzed to generate help responses. In operation 260, the captured web session data may be parsed. For example, the user may have selected a particular path of web pages during the web session. In one example, the user may not have entered required information into a first web page before moving onto a second web page. In one example, the help system may parse the context data and in operation 262 may identify the missing or incorrect information for the first web page. The phone operator or the automated response system may send a message to the client device notifying the user of the missing or incorrect data.

Different types of support may be provided for different websites. As described above, in one example the website may be used for configuring telephone services. For example, the user may configure a phone greeting during the web session. In operation 264, the help system may parse the phone greeting. For example, a voice recognition system may search for certain information in the phone greeting, such as a name of the person being called or a verbal reminder to the caller to leave their name and a phone number.

In operation 266, missing information may be identified in the audio phone greeting and a message may be sent back to the client device notifying the user of any missing information. The message may sent in real-time over the web session or may be saved as part of the context data and provided in response to the client device establishing a telephone connection with the telephony server.

In another example, operation 268 may parse call forwarding rules entered during the web session. For example, data may be entered into web pages that direct the phone service to forward incoming business phone calls to a personal phone number during the evening. Operation 270 may identify errors in the call forwarding configuration. For example, the user may have unintentionally configured the phone service to forward business calls to a home phone starting at 2:00 am. The help system may send a data or audio message to the client device identifying the possible undesirable forwarding rule.

Operation 272 may determine the phone configuration needs to be reset. For example, a client device, such as a mobile phone, may be used in the web session to configure the phone settings. The phone configuration information may be captured during the web session as part of the context data. The mobile phone may lose a wireless cellular or Wi-Fi connection before completing the phone setting configuration and the web application may not store the phone settings until the user selects a save icon.

In operation 274, the user may select the help link displayed on the client device and call the telephony server. The user may direct either the human telephone operator or an automated telephone operator to use the context data to repopulate the web pages with the previously entered phone settings. These of course are just examples and any web application and associated information that may be parsed and used for resolving web session problems.

Figure 6:
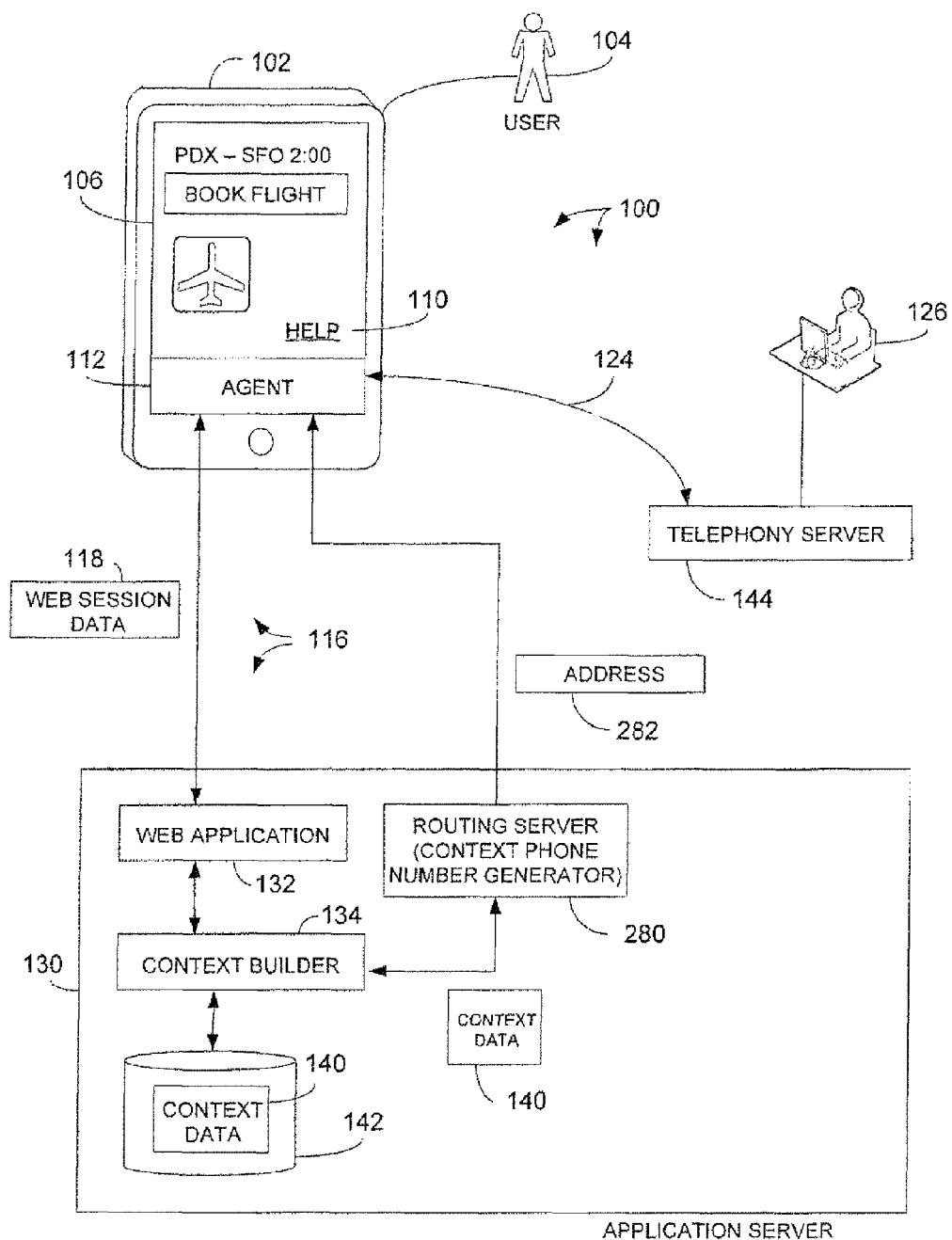
FIG. 6 depicts an example system for routing help calls based on context data.

FIG. 6 depicts another example of a context aware help system. In this example, a routing server 280 may direct telephone connection 124 to different telephony servers 144 based on context data 140. Routing server 280 may effectively operate as a context based address (e.g., phone number, IP address, URL) generator for connecting with different telephony servers 144. It should also be understood that telephony server 144 may correspond to one or more telephony servers that provide the same or similar services. For example, a plurality of telephony servers that provide language-specific sales support may be referred to as telephony server 144.

For example, context data 140 associated with web session 116 may indicate client device 102 is operating in the United States. Routing server 280 may send address 282 to agent 112 based on context data 140. For example, address 282 may be associated with a telephony server 144 specifically configured to provide support for U.S. web sessions. Agent 112 then may use address 282 to establish telephone connection 124 with the United States based telephony server 144. For example, in response to user 104 selecting help link 110, telephone connection 124 may be established with a telephony server 144 or telephone operator 126 that speaks English.

A different web session 116 may indicate the user is located or associated with Russia. For example, context data 140 may contain a user profile, web pages, or client device information that indicates user 104 is Russian or lives in Russia. Routing server 280 may generate a different address 282 that connects to a different telephony server 144 or telephone operator 126 in a Russian data center that speaks Russian.

In another example, context data 140 may indicate web session 116 is associated with either a private individual or a company. For example, user 104 may enter a user name and password during web session 116 associated with a business account. Routing server 280 may send address 282 to agent 122 associated with a business based telephony server 144. Selection of help link 110 initiates telephone connection 124 to a business call center configured to support corporate web session questions.

In yet another example, context data 140 may identify a particular product or company associated with web session 116. For example, user 104 may be in the process of booking a plane reservation through a discount travel service website. Routing server 280 may send address 282 to agent 112 that connects to a telephony server 144 for the airline selected in context data 140. Thus, address 282 may dynamically vary based on context data 140 associated with web session 116.

Figure 7:
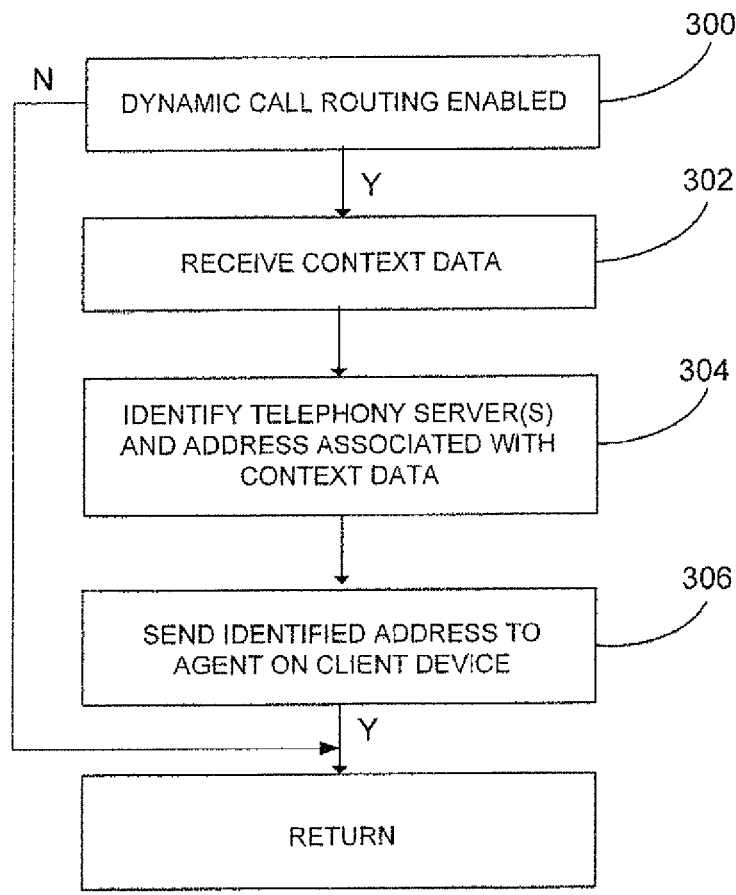
FIG. 7 depicts an example process for routing help calls based on context data.

FIG. 7 depicts one example of how the routing server may dynamically generate addresses based on context data. In operation 300, dynamic call routing may be enabled in the routing server. In operation 302, the routing server may receive the context data for a current web session. The context data may include the context identifier for the web session and any additional information needed for sending a context based phone number to the client device.

In operation 304, the routing server may identify the telephony server associated with the context data. As explained above, any context data may be used for identifying an associated telephony server, such as country information, product or service information, user information, client device information, Global Positioning System (GPS) information, or the like, or any combination thereof.

In operation 306, the address corresponding to the identified telephony server is sent to the agent on the client device and used for initiating a telephone connection. The phone number may be send to the client device in a variety of different ways, including via the network connection currently established for the web session, a separate HTTP connection, or over a telephony or SIP connection.

Figure 8:
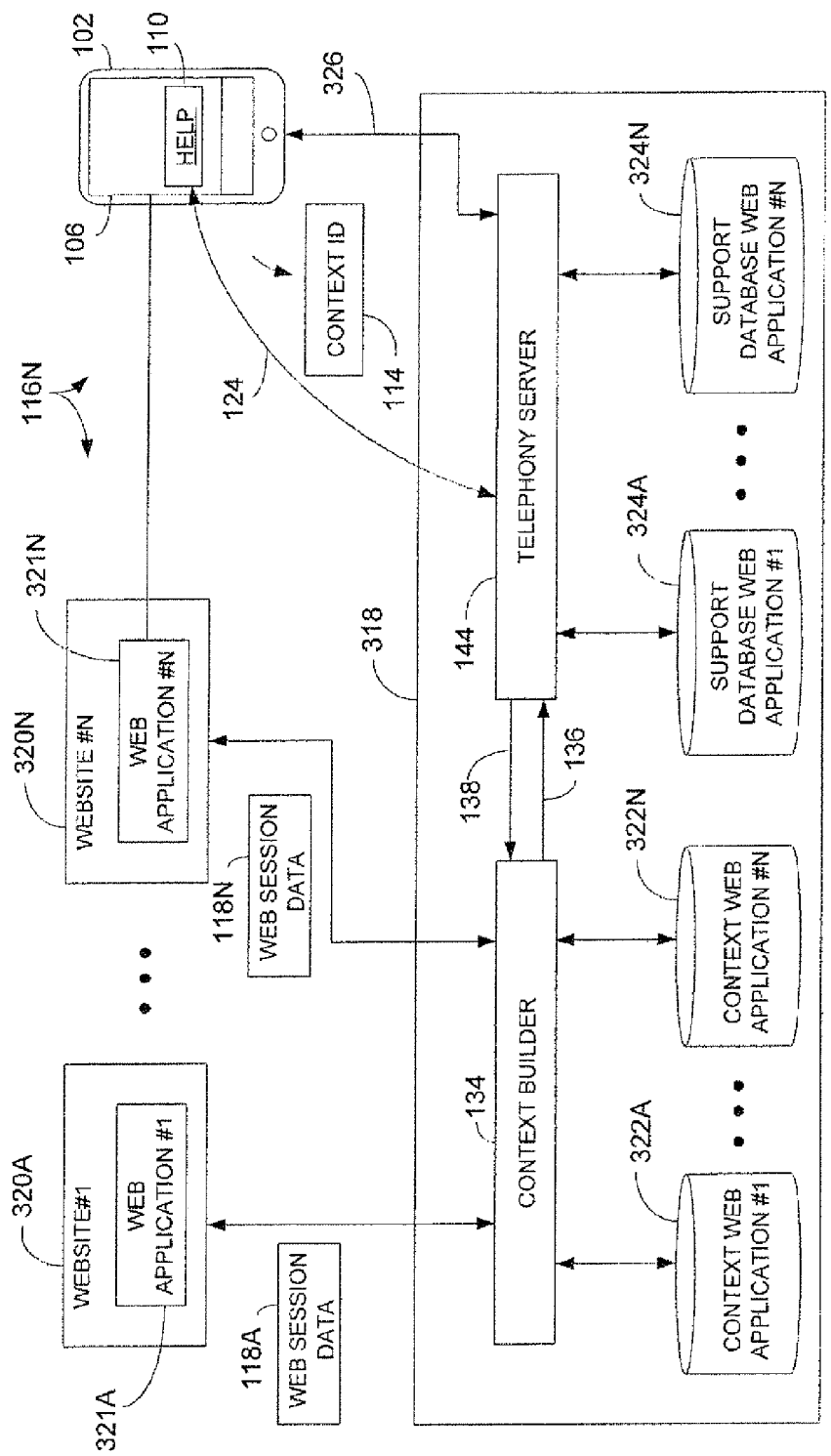
FIG. 8 depicts an example context aware help system for handling help requests for different websites.

FIG. 8 depicts another example of a context aware help system. In this example, a help system 318 may provide support for multiple different third party websites 320A-320N associated with different enterprises and/or different products and services. For example, website 320A may be operated by an enterprise that sells clothing and website 320N may be operated by a financial institution. A web application 321A on website 320A may be accessed for shopping and purchasing clothes on-line and a web application 321N on website 320N may be accessed for managing financial accounts and paying bills.

As explained above, one or more monitoring systems may monitor web sessions and send captured web session data 118 to a server operating context builder 134. Web session data 118 may include context identifiers that uniquely identify web sessions between websites 320 and client devices 102. Context builder 134 may generate and store context data 322 for the different web sessions in associated databases. For example, context data 322A for web sessions with website 320A may be saved in a first database and context data 322N for web sessions with website 320N may be saved in a second database.

In addition, context builder 134 may aggregate context data 322 across a plurality of websites 320, web applications 321, and/or web session data 118. For example, context builder 134 may determine that the same user or the same category of users has accessed different websites 320 and may accordingly aggregate context data 322 across web session data 118 from the different websites 320. Context builder 134 may correlate user activity across different websites 320 by comparing personal identifiers from web session data 118 or by performing statistical analysis across web session data 118 to determine whether there are any matches. In another example, using similar techniques, context builder 134 may determine that the same user has interacted with the same website 320A and/or web application 321A in different web sessions and may accordingly aggregate context data 322A across web session data 118A from the different web sessions. It should be understood that the previous example applies where the context aware system supports just one website 320A or a plurality of websites 320.

Telephony server 144 may provide audio and/or data support for users conducting web sessions with the different websites 320. Different support files 324A-324N may be used for providing different audio and/or digital messages associated with websites 320A-320N, respectively. For example, support files 324 may comprise audio or data blocks, responses, data files, messages, text to speech files, response rules, web session analysis algorithms, or the like, or any combination thereof needed for analyzing and responding to user help requests.

Client device 102 may establish web session 116N with web application 321N. Web session data 118N for web session 116N may be sent to context builder 134. Context builder 134 may generate context data 322N from web session data 118N. During web session 116N, a user may select help link 110 on client device 102. Client device 102 may establish a telephone connection 124 with telephony server 144 and send a context identifier 114 associated with web session 116N.

Telephony server 144 may send a request 138 to context builder 134 containing context identifier 114. Context builder 134 may send a response 136 back to telephony server 144 that contains context data 322N associated with context identifier 114. Telephony server 144 may identify or derive an audio and/or data response from support files 324N based on context data 322N. The derived response may be sent to client device 102 as an audio message over telephone connection 124 and/or may be sent to client device 102 as a digital message over a network connection 326.

Figure 9:
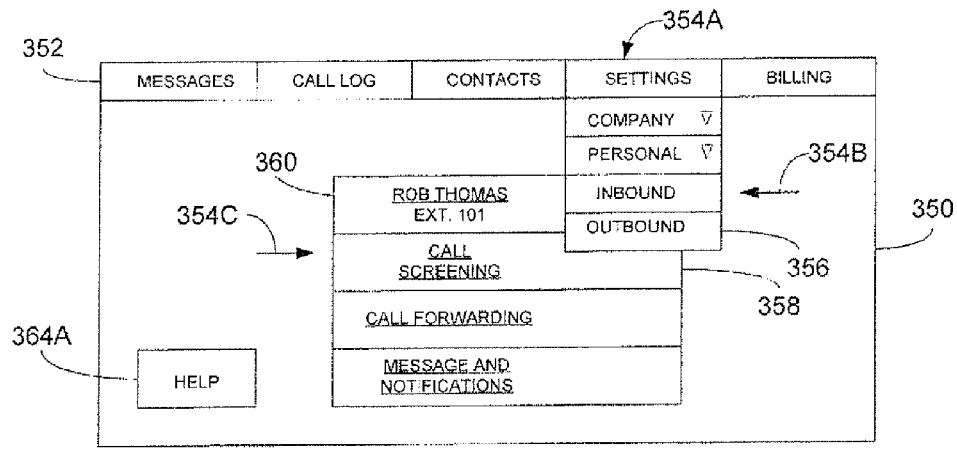
FIGS. 9 and 10 depict example web pages that use a context aware help system.
Figure 9:
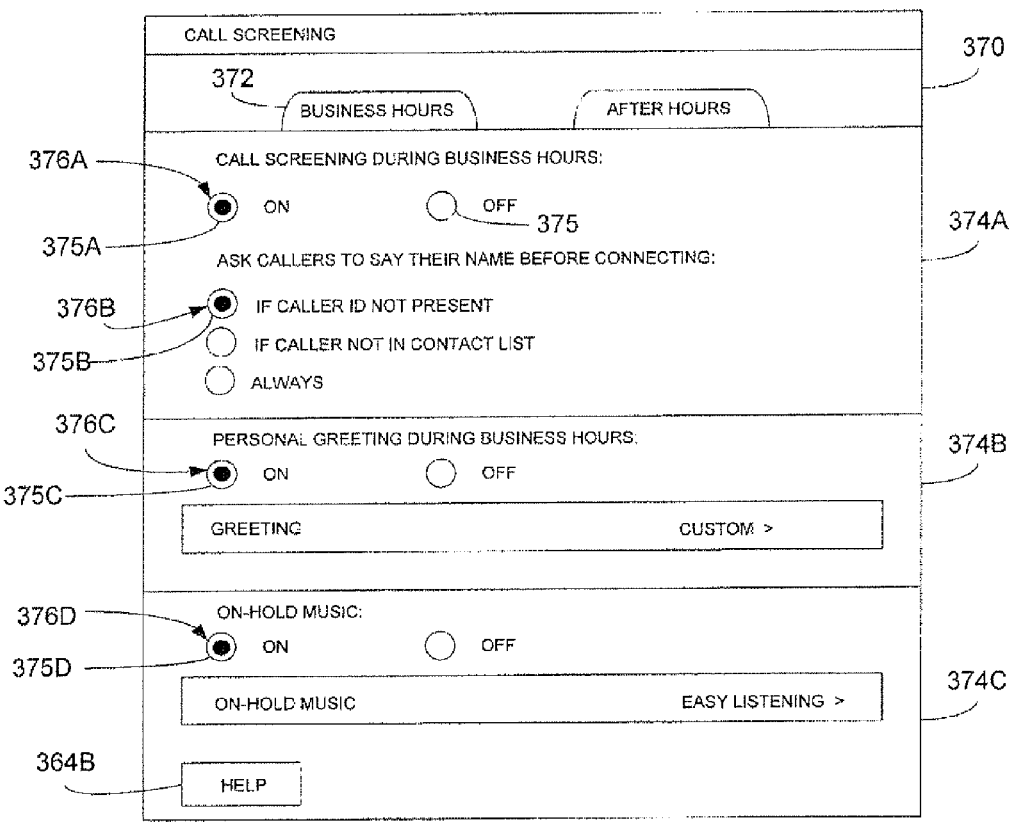

FIG. 9 depicts example web pages that may be displayed during a web session for configuring a phone service. Of course this is just an example and web pages may be displayed for any other type of web session. Web page 350 may be displayed on the client device and may include a task bar 352. The user may select 354A a settings field in task bar 352 that causes web page 350 to display a drop down menu 356. A popup window 360 may be displayed in web page 350 in response to the user then selecting 354B an inbound call field in drop down menu 356. A second web page 370 may be displayed on the client device in response to the user selecting 354C a call screening field 358 in popup window 360.

Web page 370 may display tabs 372 for selecting business hour call screening or after hours call screening. Sections 374A-374C in web page 370 may display different icons 375 for selecting different call screening settings. For example, the user may select 376A a first icon 375A in section 374A for enabling business hour call screening. The user may select 376B a second icon 375B to request callers to state their name if caller ID is not provided. Selection 376C of icon 375C and selection 376D of icon 375D may configure personal greetings and on-hold music, respectively. Web pages 350 and 370 also may display help links 364A and 364B, respectively.

The context builder may receive web session data and generate context data that contains any combination of web pages 350 and 370 and user selections 354 and/or 376. At any time during the web session, the user may select help link 364A or 364B to request either audio or digital support. For example, a telephone connection may automatically be established with a telephony server in response to selection of help link 364A. The telephony server may automatically display web page 350 to a telephone operator and then may replay user selections 354A-354C to the telephone operator. This allows the telephone operator to know exactly what web pages were opened and what inputs were entered into those web pages during the web session.

In another example, the user may select help link 364B while web page 370 is displayed on the client device. A telephone connection may again be automatically established with the telephony server. The telephony server may first display web page 350 and replay user selections 354A-354C to the telephone operator. The telephony server then may display web page 370 and replay user selections 376A-376D to the telephone operator. This allows the telephone operator to see the sequence of web pages that were opened during the web session and the user selections on each of the web pages. Any other automated customized audio or digital responses may also be generated in response to selection of help links 364A and 364B. For example, the telephony server may generate an automated voice message explaining how to complete the settings for the call screening tasks in web pages 350 and 370.

As described above, the context data can also be used to reconfigure a web session. For example, the user may have entered all of the selections shown in web pages 350 and 370. However, before saving the configurations, the client device may have been disconnected from the web application. The user may select help link 364A or 364B and request the telephony server or the telephone operator to recreate the call screening settings. The context data containing the call settings in FIG. 9 may be sent to the web application for the phone service website. The web application then may repopulate web pages 350 and 370 with the user selections 354 and 376, respectively, from the previous web session.

In another example, the user may select a help link on a second phone to establish the telephone connection with the telephony server. The agent on the second phone may send GPS data to the telephony server that indicates the second phone is in close proximity to the first phone. Alternatively, the help system may be configured to identify the two phones as operated or owned by the same user. The telephony server may use the context data associated with the web session with the first phone to send help information to the second phone. For example, the user may use the second phone to recreate phone setting 354 and 376 previously entered in the web session with the first phone.

Figure 10:
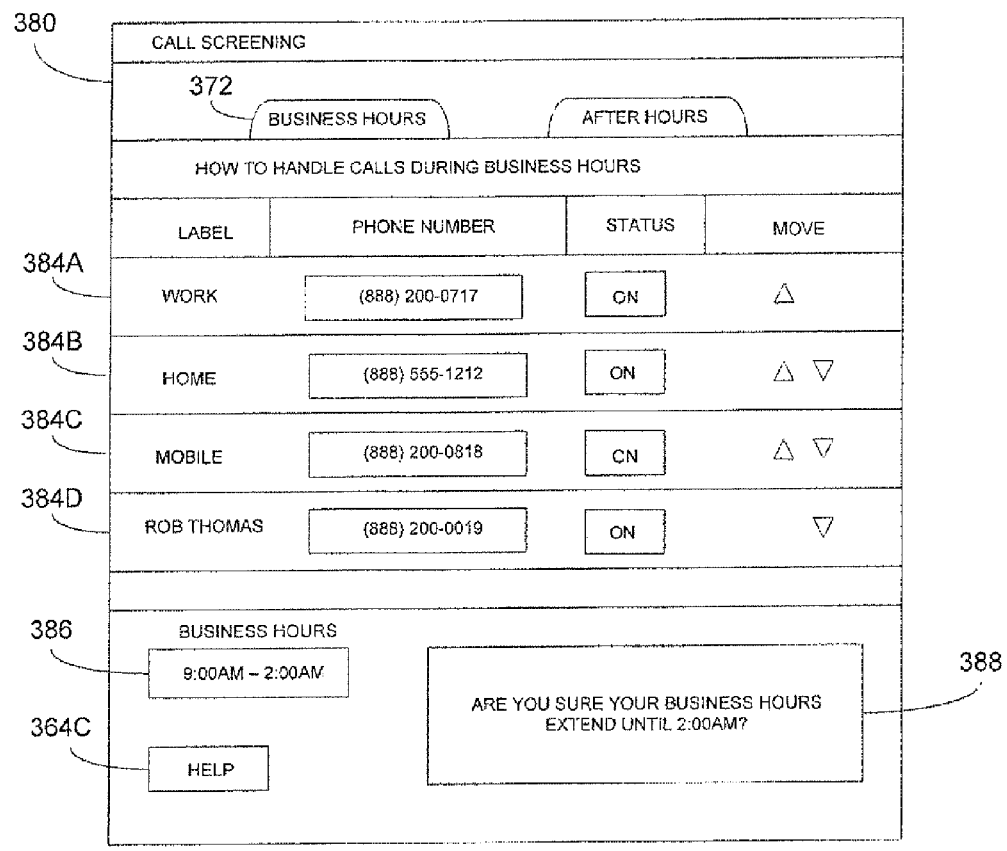

FIG. 10 depicts another example web page 380 used for configuring call settings. Web page 380 displays tabs 372 for configuring business hours and after hours call screening tasks. User inputs are entered into sections 384A-384D to select different labels, phones numbers, status, and move settings for handling phone calls. A user may enter a time value into a field 386 for identifying what time period is associated with business hours. A help link 364C may be displayed and selected to access the help system described above.

In this example, the user may have entered 9:00 am-2:00 am as the time period associated with business hours. The time period in field 386 may have been captured during the web session and sent to the context builder. The context builder may analyze the context data and determine the time period 9:00 am-2:00 am is unusual for business hours. The help system may send a voice or text message 388 to the client device in response to the time period setting querying weather business hours actually extend until 2:00 am. For example, message 388 may comprise an audio message sent to the client device over the telephone connection. In another example, message 388 may comprise text displayed in a pop-up window.

The help system may identify other bad configurations entered into the web pages in FIG. 9 or 10. For example, the user may have selected settings that forward phone calls from a first phone number to a second phone number. However, the second phone number may have previously been configured to forward phone calls to the first phone number. The help system may analyze the context data and send a message 388 back to the client device notifying the user of the circular phone configuration.

In another example, the help system may parse through an audio voice greeting input by the user during the web session. The context builder or the telephony server may use a voice recognition system to identify different information in the voice greeting, such as audio requesting the caller to leave a name and return phone number. If certain information is missing from the voice greeting, the help system may send a message 388 to the client device notifying the user of the missing information in the voice greeting.

In another example, the user may configure company phone extensions through the web pages in FIGS. 9 and 10. The help system may determine from the context data that there are only thirty phone extensions. However, the user may have entered four digit extensions. The help system may send a message 388 to the client device indicating two digit phone extensions may be sufficient for the phone extension settings.

In yet another example, the help system may send an advertisement message 388 to the client device based on the context data. For example, the context data may indicate the user is shopping on a clothing website. The help system may send an audio or data advertisement message 388 with a discount on particular clothing items.

Messages and other context information may be fed back to the client device prior to the user selecting help link 364C. For example, the help system may open a pop-up window and send help message 388 based on a path or sequence of web pages opened during the web session. In another example, message 388 may be sent in response to a delay by the user in moving through one or more web pages or based on any other web session metric.

Figure 11:
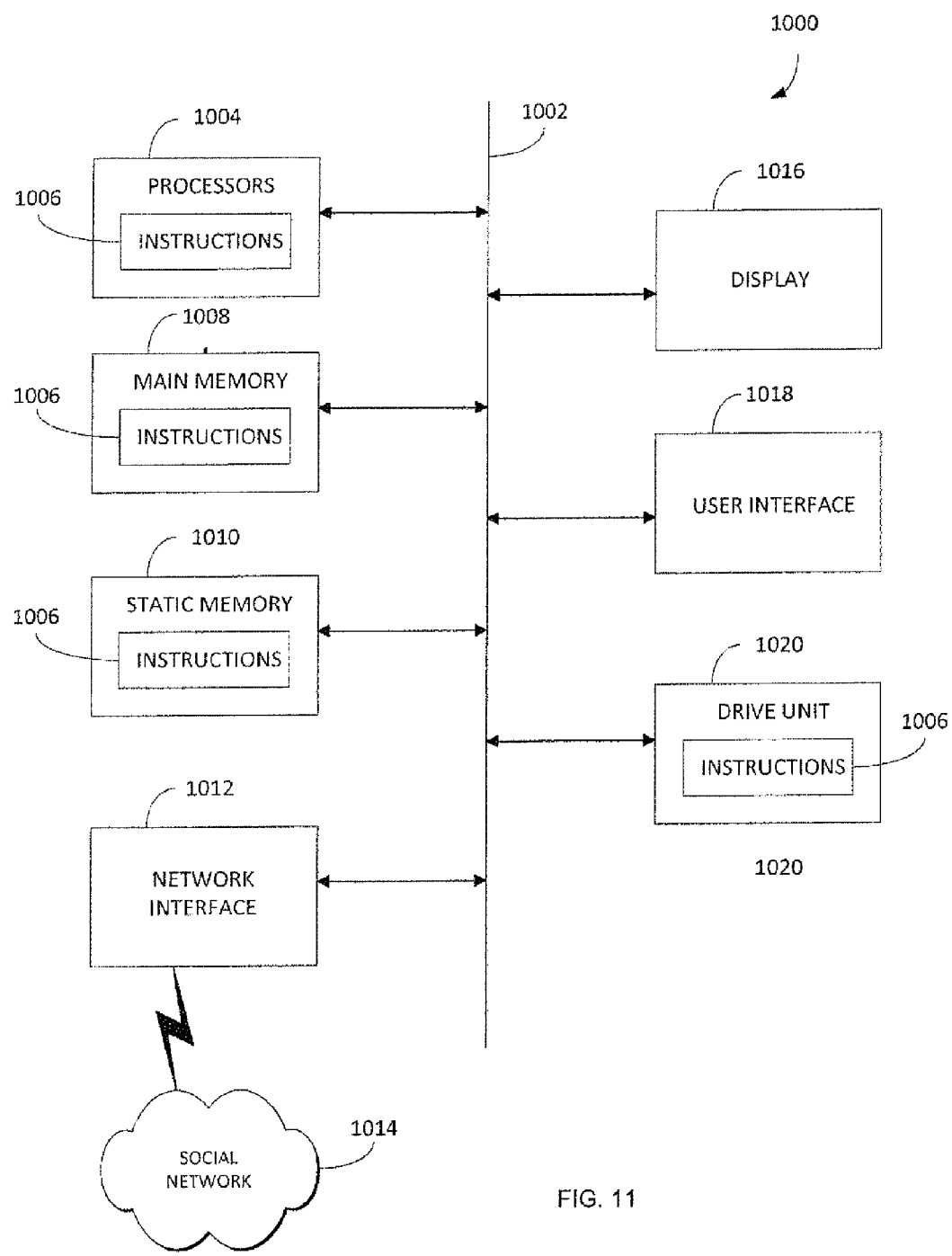
FIG. 11 depicts an example computing device for operating a context aware help system.

FIG. 11 shows a computing device 1000 that may be used for operating the help system described above. The computing device 1000 may operate in the capacity of a server or a client machine in a server-client network environment, or as a peer machine in a peer-to-peer (or distributed) network environment. In other examples, computing device 1000 may be a personal computer (PC), a tablet, a Personal Digital Assistant (PDA), a cellular telephone, a smart phone, a web appliance, or any other machine or device capable of executing instructions 1006 (sequential or otherwise) that specify actions to be taken by that machine.

While only a single computing device 1000 is shown, the computing device 1000 may include any collection of devices or circuitry that individually or jointly execute a set (or multiple sets) of instructions to perform any one or more of the operations discussed above. Computing device 1000 may be part of an integrated control system or system manager, or may be provided as a portable electronic device configured to interface with a networked system either locally or remotely via wireless transmission.

Processors 1004 may comprise a central processing unit (CPU), a graphics processing unit (GPU), programmable logic devices, dedicated processor systems, micro controllers, or microprocessors that may perform some or all of the operations described above. Processors 1004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 1004 may execute instructions or "code" 1006 stored in any one of memories 1008, 1010, or 1020. The memories may store data as well. Instructions 1006 and data can also be transmitted or received over a network 1014 via a network interface device 1012 utilizing any one of a number of well-known transfer protocols.

Memories 1008, 1010, and 1020 may be integrated together with processing device 1000, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing device 1000 can further include a video display 1016, such as a liquid crystal display (LCD) or a cathode ray tube (CRT)) and a user interface 1018, such as a keyboard, mouse, touch screen, etc. All of the components of computing device 1000 may be connected together via a bus 1002 and/or network.

For the sake of convenience, operations may be described as various interconnected or coupled functional blocks or diagrams. However, there may be cases where these functional blocks or diagrams may be equivalently aggregated into a single logic device, program or operation with unclear boundaries.

Having described and illustrated the principles of a preferred embodiment, it should be apparent that the embodiments may be modified in arrangement and detail without departing from such principles. Claim is made to all modifications and variation coming within the spirit and scope of the following claims.

The invention claimed is:

1. A method, comprising:
   receiving web session data for a web session;
   generating context data associated with the web session data, wherein generating the context data comprises:
   assigning timestamps to web pages opened on a computing device during the web session;
   assigning timestamps to user inputs entered into the web pages during the web session; and
   identifying an ordered sequence of the web pages opened during the web session and the user inputs entered into the web pages;
   receiving, by a telephony server, a telephone call from the computing device;
   requesting, by the telephony server, the context data associated with the web session for the computing device; and
   responding, by the telephony server, to the telephone call based on the context data associated with the web session.

2. The method of claim 1, further comprising:
   receiving, by the telephony server, a context identifier over the telephone call associated with the web session; and
   sending, by the telephony server, the context identifier to a context server to obtain the context data associated with the web session.

3. The method of claim 1, wherein responding to the telephone call comprises:
   connecting the telephone call to a telephone operator; and
   displaying the context data to the telephone operator.

4. The method of claim 1, further comprising:
   generating, by the telephony server, an audio message based on the context data; and
   sending the audio message to the computing device.

5. The method of claim 1, further comprising sending a response to the computing device based on the ordered sequence of the web pages opened during the web session and the user inputs entered into the web pages.

6. The method of claim 1, wherein responding to the telephone call comprises sending at least one of a data message and/or an audio message to the computing device based on the context data.

7. The method of claim 1, further comprising:
   identifying fields in the web pages; and
   responding to the telephone call based on data entered into the fields in the web pages.

8. The method of claim 1, further comprising:
   identifying an address for the telephony server based on the context data; and
   sending the address to the computing device for establishing a connection with the telephony server.

9. The method of claim 1, further comprising:
identifying advertisements based on the context data; and
sending the advertisements to the computing device.

10. The method of claim 1, further comprising:
receiving a request to repopulate the web pages from the web session; and
repopulate the web pages using the context data.

11. An apparatus, comprising:
logic circuitry configured to:
identify a web session associated with a client device;
generate context data for the web session; and
generate a response based on the context data,
wherein the logic circuitry further comprises a telephony server configured to:
receive a telephone call from the client device;
establish a telephone connection with the client device;
receive a context identifier from the client device over the telephone connection;
identify the context data associated with the context identifier;
generate a customized automated audio response based on the identified context data; and
play the customized automated audio response over the telephone connection to the client device.

12. The apparatus of claim 11, wherein the telephony server is further configured to:
forward the telephone call to an operator; and
display the context data to the operator.

13. The apparatus of claim 11, wherein the logic circuitry further comprises a context server configured to:
identify a path of web pages accessed by the client device during the web session; and
identifying the path in the context data.

14. The apparatus of claim 13, wherein the response is based on the path of web pages accessed by the client device during the web session.

15. The apparatus of claim 11, wherein the response comprises an audio message sent over a telephone connection established with the client device.

16. The apparatus of claim 11, wherein the response comprises a data message sent over a network connection established with the client device.

17. The apparatus of claim 11, wherein the logic circuitry is configured to:
passively collect web session data during the web session with the client device;
generate the context data from the web session data; and
generate the response from the context data in response to a help request received from the client device.

18. The apparatus of claim 11, wherein the logic circuitry further comprises:
a context server configured to generate the context data from web session data; and
the telephony server is configured to forward the context identifier to the context server to identify the context data associated with the context identifier.

19. The apparatus of claim 11, wherein the logic circuitry further comprises an agent operating on the client device.

20. An apparatus, comprising:
logic circuitry configured to:
identify a web session associated with a client device;
generate context data for the web session; and
generate a response based on the context data; wherein the logic circuitry comprises:
a context server configured to generate the context data from web session data;
a telephony server configured to receive a telephone call from the client device, receive a context identifier over the telephone call, and forward the context identifier to the context server to identify the context data associated with the context identifier; and
a call routing server configured to:
identify an address for the telephony server based on the context data; and
forward the address to the client device for establishing a connection with the telephony server.

21. An apparatus, comprising:
logic circuitry configured to:
identify a web session associated with a client device;
generate context data for the web session; and
generate a response based on the context data, wherein the logic circuitry comprises an agent operating on the client device and the context data generated by the agent comprises at least a context identifier and wherein the agent is configured to:
establish a telephone connection with a telephony server in response to selection of a help link; and
send the context identifier over the telephone connection to the telephony server.

22. The apparatus of claim 21, wherein the agent is further configured to:
receive a message from a context server, wherein the message is based on some of the context data; and
display the message on the client device.

23. A system, comprising:
a context server configured to receive context data for web sessions performed with computing devices;
a telephony server configured to:
receive phone calls from the computing devices;
establish telephone connections with the computing devices;
receive context identifiers over the telephone connections;
forward the context identifiers to the context server;
receive the context data from the context server associated with the context identifiers; and
respond to the telephone calls based on the context data received from the context server; and
a call routing server configured to:
identify addresses for contacting different telephony servers based on the context data; and
forward the addresses to the computing devices for calling the different telephony servers.

24. The system of claim 23, wherein the context server is further configured to:
identify paths of web pages accessed by the computing devices during the web sessions; and
identify the paths in the context data.

25. A system, comprising:
a context server configured to:
correlate a plurality of web sessions based on web session data; and
aggregate context data across the correlated web sessions; and
a telephony server configured to:
receive phone calls from computing devices;
establish telephone connections with the computing devices;
receive context identifiers over the telephone connections;
forward the context identifiers to the context server;
receive the context data from the context server associated with the context identifiers; and
respond to the phone calls based on the context data received from the context server.

* * * * *